(12) United States Patent
Kim

(10) Patent No.: US 12,435,838 B2
(45) Date of Patent: Oct. 7, 2025

(54) HYDROGEN STORAGE SYSTEM AND METHOD FOR CONTROLLING THE SAME

(71) Applicants: HYUNDAI MOTOR COMPANY, Seoul (KR); KIA CORPORATION, Seoul (KR)

(72) Inventor: Yun Sik Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 303 days.

(21) Appl. No.: 17/881,773

(22) Filed: Aug. 5, 2022

(65) Prior Publication Data

US 2023/0279999 A1    Sep. 7, 2023

(30) Foreign Application Priority Data

Mar. 3, 2022  (KR) .................. 10-2022-0027558

(51) Int. Cl.
*F17C 13/02*  (2006.01)
*B60L 50/70*  (2019.01)
(Continued)

(52) U.S. Cl.
CPC ............ *F17C 13/025* (2013.01); *B60L 50/70* (2019.02); *F17C 5/007* (2013.01);
(Continued)

(58) Field of Classification Search
CPC ............... F17C 13/025; F17C 5/007; F17C 2205/0326; F17C 2205/0338; F17C 2221/012; F17C 2250/032; F17C 2250/043; F17C 2250/0694; F17C 2270/0168; F17C 2270/0184; F17C 5/06; F17C 5/00; F17C 13/04; B60L 50/70; H01M 8/04089;
(Continued)

(56) References Cited

U.S. PATENT DOCUMENTS 7,442,452 B2 * 10/2008 Miura ............... H01M 8/04388
                                                            429/424
8,020,589 B2 *  9/2011 Cohen ................. F17C 13/025
                                                            141/234
(Continued)

FOREIGN PATENT DOCUMENTS

EP         3144577 B1 *  8/2018  ................ F17C 5/06
JP       2020-112242 A     7/2020
(Continued)

OTHER PUBLICATIONS

KR-20160076401-A English Translation of Specification (Year: 2024).*
JP-6781757-B2 English Translation of Specification (Year: 2024).*

*Primary Examiner* — Kenneth Rinehart
*Assistant Examiner* — Stephanie A Shrieves
(74) *Attorney, Agent, or Firm* — MCDONNELL BOEHNEN HULBERT & BERGHOFF LLP

(57) ABSTRACT

A hydrogen storage system and a method for controlling the same includes a detection device that detects a first hydrogen pressure decompressed by a regulator using a first pressure sensor in the hydrogen storage system and a processor that predicts generation of noise at the regulator based on a change rate of the first hydrogen pressure during hydrogen charging and stops the hydrogen charging.

18 Claims, 5 Drawing Sheets

(51) Int. Cl.
*F17C 5/00* (2006.01)
*H01M 8/04082* (2016.01)
*H01M 8/04089* (2016.01)
*H01M 8/0438* (2016.01)
*H01M 8/04664* (2016.01)
*H01M 8/04746* (2016.01)

(52) U.S. Cl.
CPC ... *H01M 8/04089* (2013.01); *H01M 8/04201* (2013.01); *H01M 8/04388* (2013.01); *H01M 8/04686* (2013.01); *H01M 8/04753* (2013.01); *F17C 2205/0326* (2013.01); *F17C 2205/0338* (2013.01); *F17C 2221/012* (2013.01); *F17C 2250/032* (2013.01); *F17C 2250/043* (2013.01); *F17C 2250/0694* (2013.01); *F17C 2270/0168* (2013.01); *F17C 2270/0184* (2013.01); *H01M 2250/20* (2013.01)

(58) Field of Classification Search
CPC ......... H01M 8/04201; H01M 8/04388; H01M 8/04686; H01M 8/04753; H01M 2250/20; Y02E 60/32
USPC .......................................................... 141/340
See application file for complete search history.

(56) References Cited

U.S. PATENT DOCUMENTS

| | | | |
|---|---|---|---|
| 9,682,701 B2* | 6/2017 | Saito | B60W 20/50 |
| 10,800,281 B2* | 10/2020 | Boisen | B60L 53/66 |
| 11,274,794 B2 | 3/2022 | Ogiwara | |
| 11,370,651 B2 | 6/2022 | Natori et al. | |
| 2005/0014042 A1* | 1/2005 | Brenner | H01M 8/04679 429/431 |
| 2006/0134478 A1* | 6/2006 | Fuse | H01M 8/04231 429/513 |
| 2007/0125441 A1* | 6/2007 | Farese | F17C 5/06 141/2 |
| 2007/0186982 A1* | 8/2007 | Cohen | F17C 13/025 137/487.5 |
| 2008/0245437 A1 | 10/2008 | Shige | |
| 2010/0228399 A1* | 9/2010 | Udischas | F17C 13/04 700/282 |
| 2014/0216599 A1* | 8/2014 | Loewenthal | F17C 5/00 141/4 |
| 2014/0261742 A1* | 9/2014 | Heise | H01M 8/04776 137/72 |
| 2014/0290790 A1* | 10/2014 | Mathison | F17C 5/007 141/94 |
| 2015/0188165 A1* | 7/2015 | Shim | F17C 11/005 137/15.04 |
| 2018/0266633 A1 | 9/2018 | Fujita | |
| 2020/0223684 A1* | 7/2020 | Natori | B67D 7/04 |
| 2020/0240587 A1* | 7/2020 | Ogiwara | H01M 8/04776 |
| 2021/0126270 A1 | 4/2021 | Min et al. | |

FOREIGN PATENT DOCUMENTS

| | | | | |
|---|---|---|---|---|
| JP | 6781757 B2 * | 11/2020 | | G01M 3/26 |
| JP | 6800254 B2 | 12/2020 | | |
| KR | 10-0852267 B1 | 8/2008 | | |
| KR | 20160076401 A * | 6/2016 | | B60L 50/72 |
| KR | 10-1655124 B1 | 9/2016 | | |
| KR | 2021-048620 A | 5/2021 | | |

* cited by examiner

HYDROGEN STORAGE SYSTEM AND METHOD FOR CONTROLLING THE SAME

CROSS REFERENCE TO RELATED APPLICATIONS

This application claims the benefit of priority to Korean Patent Application No. 10-2022-0027558, filed in the Korean Intellectual Property Office on Mar. 3, 2022, the entire contents of which are incorporated herein by reference.

TECHNICAL FIELD

The present disclosure relates to a hydrogen storage system and a method for controlling the same.

BACKGROUND

A fuel cell electric vehicle (FCEV) operates by driving a motor by using electricity obtained by reacting hydrogen with oxygen in air. The FCEV is equipped with a fuel cell system, a motor, a battery, and a hydrogen storage system. Among the fuel cell system, the motor, the battery, and the hydrogen storage system, the hydrogen storage system decompresses high-pressure hydrogen stored in a fuel tank through a high-pressure regulator and supplies the high-pressure hydrogen to a fuel cell stack. To prevent hydrogen pressure from rising due to the poor pressure reduction performance of the high-pressure regulator when hydrogen is supplied, a pressure relief valve (PRV) is mounted on the hydrogen storage system. When the hydrogen pressure supplied to the fuel cell stack increases, the PRV releases hydrogen into the atmosphere, and thus the PRV protects the hydrogen storage system from overpressure. However, the PRV operates while hydrogen is charged and generates noise at the high-pressure regulator, which may cause anxiety to a user.

SUMMARY

The present disclosure has been made to solve the above-mentioned problems occurring in the prior art while advantages achieved by the prior art are maintained intact.

An aspect of the present disclosure provides a hydrogen storage system that controls hydrogen charging to be stopped based on a change in medium pressure to prevent noise from a high-pressure regulator when charging hydrogen, and a method for controlling the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hydrogen storage system includes a detection device that detects a first hydrogen pressure decompressed by a regulator using a first pressure sensor in the hydrogen storage system and a processor that predicts generation of noise at the regulator based on a change rate of the first hydrogen pressure during hydrogen charging and controls the hydrogen charging to be stopped.

The processor compares the first hydrogen pressure with a predetermined minimum reference pressure, and starts control according to safety logic when the first hydrogen pressure is not less than the predetermined minimum reference pressure.

The processor calculates a first hydrogen pressure slope using the first hydrogen pressure, compares the calculated first hydrogen pressure slope with a predetermined reference slope, and transmits a charging stop signal when the calculated first hydrogen pressure slope is not less than the predetermined reference slope.

The processor classifies a charging state into at least two or more steps depending on the first hydrogen pressure, calculates a first hydrogen pressure slope during a time different for each classified charging state, compares the calculated first hydrogen pressure slope with a reference pressure slope matching the classified charging state, and transmits a charging stop signal when the calculated first hydrogen pressure slope is not less than the reference pressure slope matching the classified charging state.

The hydrogen storage system further includes a solenoid valve mounted on a front end of the regulator. The processor controls the solenoid valve to adjust pressure flowing into the regulator when it is expected that the noise is generated at the regulator.

The hydrogen storage system further includes a noise meter that measures the noise generated at the regulator. The processor controls charging stop based on noise data measured by the noise meter.

The detection device detects second hydrogen pressure before decompression by the regulator using a second pressure sensor in the hydrogen storage system.

The processor determines whether the hydrogen charging is in progress, based on the second hydrogen pressure.

The hydrogen storage system further includes a communication device that transmits a charging stop signal to a hydrogen refueling station through an IR emitter.

The processor determines whether the first pressure sensor is faulty, based on a sensor voltage of the first pressure sensor.

According to an aspect of the present disclosure, a hydrogen storage system controlling method includes detecting a first hydrogen pressure decompressed by a regulator using a first pressure sensor in a hydrogen storage system, predicting generation of noise at the regulator based on a change rate of the first hydrogen pressure during hydrogen charging, and controlling the hydrogen charging to be stopped when it is expected that the noise is generated.

The predicting of the generation of the noise at the regulator includes calculating a first hydrogen pressure slope using the first hydrogen pressure, comparing the first hydrogen pressure slope with a predetermined reference slope, and determining that the noise is generated at the regulator, when the first hydrogen pressure slope is not less than the predetermined reference slope.

The predicting of the generation of the noise at the regulator includes comparing the first hydrogen pressure slope during a predetermined first time with a predetermined first reference pressure slope when the first hydrogen pressure is not less than a minimum reference pressure and is less than a first reference pressure, determining that the noise is generated at the regulator, when the first hydrogen pressure slope during the predetermined first time is not less than the predetermined first reference pressure slope, and determining that the noise is not generated at the regulator, when the first hydrogen pressure slope during the predetermined first time is less than the predetermined first reference pressure slope.

The predicting of the generation of the noise at the regulator further includes comparing the first hydrogen pressure slope during a predetermined second time with a predetermined second reference pressure slope when the first hydrogen pressure is not less than the first reference pressure and is less than a second reference pressure, determining that the noise is generated at the regulator, when the first hydrogen pressure slope during the predetermined second time is not less than the predetermined second reference pressure slope, and determining that the noise is not generated at the regulator, when the first hydrogen pressure slope during the predetermined second time is less than the predetermined second reference pressure slope.

The predicting of the generation of the noise at the regulator further includes comparing the first hydrogen pressure slope during a predetermined third time with a predetermined third reference pressure slope when the first hydrogen pressure is not less than the second reference pressure and is less than a third reference pressure, determining that the noise is generated at the regulator, when the first hydrogen pressure slope during the predetermined third time is not less than the predetermined third reference pressure slope, and determining that the noise is not generated at the regulator, when the first hydrogen pressure slope during the predetermined third time is less than the predetermined third reference pressure slope.

The predicting of the generation of the noise at the regulator further includes comparing the first hydrogen pressure slope during a predetermined fourth time with a predetermined fourth reference pressure slope when the first hydrogen pressure is not less than the third reference pressure and is less than a fourth reference pressure, determining that the noise is generated at the regulator, when the first hydrogen pressure slope during the predetermined fourth time is not less than the predetermined fourth reference pressure slope, and determining that the noise is not generated at the regulator, when the first hydrogen pressure slope during the predetermined fourth time is less than the predetermined fourth reference pressure slope.

The predicting of the generation of the noise at the regulator further includes comparing the first hydrogen pressure slope during a predetermined fifth time with a predetermined fifth reference pressure slope when the first hydrogen pressure is not less than the fourth reference pressure, determining that the noise is generated at the regulator, when the first hydrogen pressure slope during the predetermined fifth time is not less than the predetermined fifth reference pressure slope, and determining that the noise is not generated at the regulator, when the first hydrogen pressure slope during the predetermined fifth time is less than the predetermined fifth reference pressure slope.

The first time, the second time, the third time, the fourth time, and the fifth time are set in order from greatest to smallest values.

The hydrogen storage system controlling method further includes detecting second hydrogen pressure before decompression by the regulator using a second pressure sensor in the hydrogen storage system and determining whether the hydrogen charging is in progress, based on the second hydrogen pressure.

The controlling of the hydrogen charging to be stopped includes transmitting a charging stop signal to a hydrogen refueling station through a communication device.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
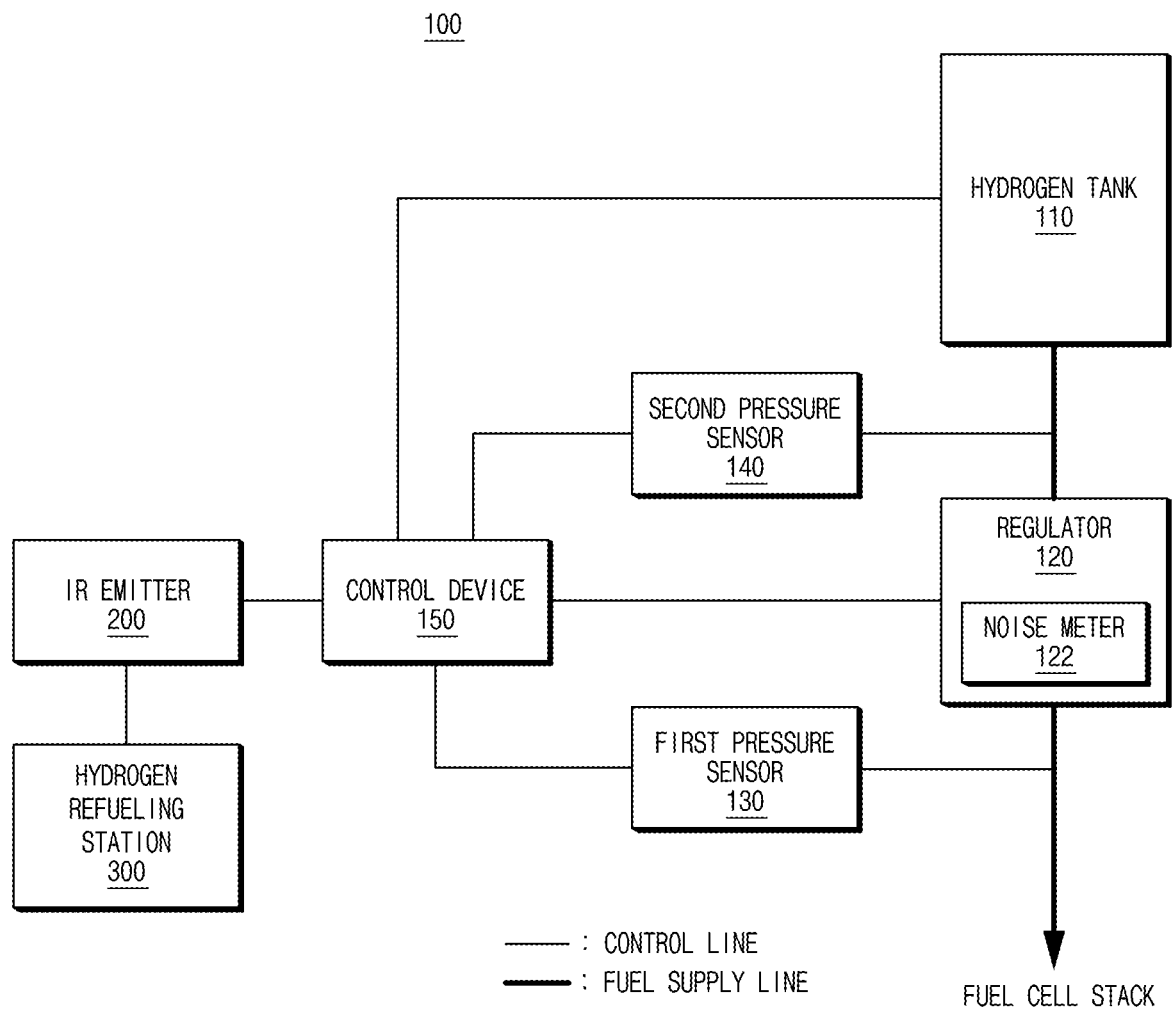
FIG. 1 is a block diagram schematically illustrating a hydrogen storage system, according to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram schematically illustrating a hydrogen storage system, according to embodiments of the present disclosure.

Referring to FIG. 1, a hydrogen storage system 100 may supply hydrogen to generate electric energy of a fuel cell stack in a FCEV. The hydrogen storage system 100 may include a hydrogen tank 110, a regulator 120, a first pressure sensor 130, a second pressure sensor 140, and a control device 150.

The hydrogen tank 110 may store hydrogen used as fuel in the FCEV. The hydrogen tank 110 may store hydrogen gas compressed under high pressure. The hydrogen tank 110 may be manufactured from carbon fiber reinforced composites capable of withstanding high pressure. The at least one hydrogen tank 110 may be mounted on a vehicle. The hydrogen tank 110 may be equipped with a solenoid valve that opens or shuts off a flow path of hydrogen gas supplied to a fuel cell stack (not shown).

The regulator 120 may reduce high-pressure hydrogen gas (e.g., 700 bar) supplied from the hydrogen tank 110 to a predetermined medium-pressure hydrogen gas. The regulator 120 may supply decompressed hydrogen to the fuel cell stack.

The first pressure sensor 130 may be mounted on a fuel supply line connecting the regulator 120 and the fuel cell stack. The first pressure sensor 130 may measure the pressure of hydrogen decompressed by the regulator 120. The first pressure sensor 130 may be implemented as a mid-pressure sensor.

The second pressure sensor 140 may be mounted on a fuel supply line connecting the hydrogen tank 110 and the regulator 120. The second pressure sensor 140 may measure high-pressure hydrogen pressure flowing into the regulator 120. The second pressure sensor 140 may be implemented as a high-pressure sensor.

The control device 150 may be a hydrogen storage system management unit (HMU), which may control the overall operation of the hydrogen storage system 100. The control device 150 may obtain a sensor value in the hydrogen storage system 100, may perform charging communication with a hydrogen refueling station 300, and may control hydrogen charging.

Figure 2:
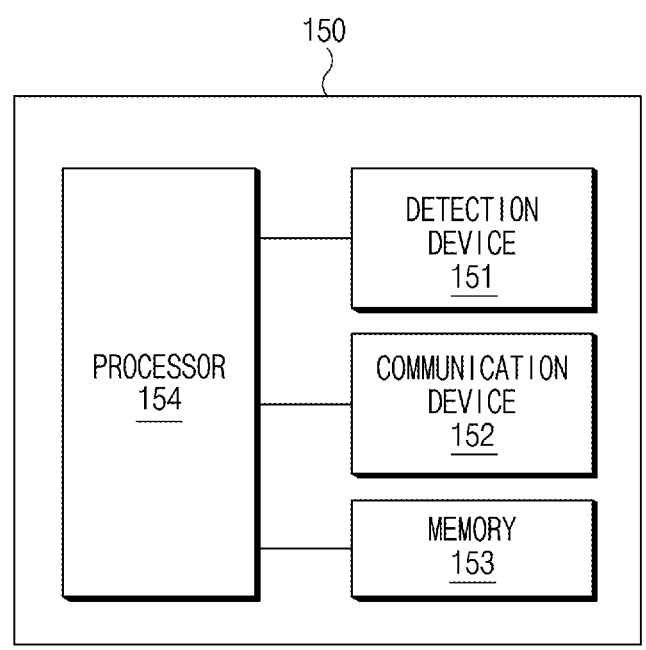
FIG. 2 is a block diagram illustrating a control device in a hydrogen storage system, according to embodiments of the present disclosure.

FIG. 2 is a block diagram illustrating a control device in a hydrogen storage system, according to embodiments of the present disclosure.

Referring to FIG. 2, in a hydrogen storage system, the control device 150 may include a detection device 151, a communication device 152, a memory 153, and a processor 154.

The detection device 151 may detect (obtain) first hydrogen pressure (medium pressure) and second hydrogen pressure (high pressure) through the first pressure sensor 130 and the second pressure sensor 140 in the hydrogen storage system 100, respectively. The first pressure sensor 130 may measure and transmit the pressure (the first hydrogen pressure) of hydrogen decompressed by the regulator 120. The second pressure sensor 140 may measure and transmit the pressure (i.e., hydrogen tank pressure) (the second hydrogen pressure) of hydrogen before the pressure is reduced by the regulator 120. In other words, the first pressure sensor 130 may measure the hydrogen pressure passed through the regulator 120, and the second pressure sensor 140 may measure the hydrogen pressure before going through the regulator 120. The detection device 151 may receive information about the first hydrogen pressure and the second hydrogen pressure, which are transmitted from the first pressure sensor 130 and the second pressure sensor 140, and may transmit the information about the first hydrogen pressure and the second hydrogen pressure to the processor 154.

Also, the detection device 151 may detect a sensor voltage of the first pressure sensor 130. In this case, the detection device 151 may detect a sensor voltage by using a voltage sensor or a current sensor.

The communication device 152 may transmit a charging stop signal through an infrared (IR) emitter 200 depending on an instruction of the processor 154. The IR emitter 200 (net shown) may transmit, to a hydrogen refueling station 300, an infrared signal indicating stopping charging. The IR emitter 200 may be installed near a charging connector of a vehicle.

Furthermore, the communication device 152 may support wired communication or wireless communication between the control device 150 and an external electronic device (e.g., a charger of the hydrogen refueling station). The communication device 152 may include a wired communication circuit and/or a wireless communication circuit. The wired communication circuit may communicate with the external electronic device by using a local area network (LAN), a wide area network (WAN), Ethernet, and/or an integrated services digital network (ISDN). The wireless communication circuit may communicate with the external electronic device by using mobile communication, short-range wireless communication (Bluetooth, near field communication (NFC), and/or infrared communication (Infrared Data Association (IrDA))), and wireless Internet communication (Wi-Fi).

The memory 153 may store information about the first hydrogen pressure (medium pressure) and the second hydrogen pressure (high pressure) detected by the detection device 151. The memory 153 may store safety logic, charging state determination logic, state transition logic and/or noise failure determination logic. The memory 153 may store various pieces of setting information, for example, a minimum reference pressure, a reference slope, a first reference pressure slope, a second reference pressure slope, a third reference pressure slope, a fourth reference pressure slope, and a fifth reference pressure slope. The memory 153 may be a non-transitory storage medium that stores instructions executed by the processor 154. The memory 153 may include at least one of storage media such as a flash memory, a hard disk, a solid state disk (SSD), a secure digital (SD) card, a random access memory (RAM), a static random access memory (SRAM), a read only memory (ROM), a programmable read only memory (PROM), an electrically erasable and programmable ROM (EEPROM), and an erasable and programmable ROM (EPROM).

The processor 154 may control overall operations of the control device 150. The processor 154 may be implemented with at least one of processing devices such as an application specific integrated circuit (ASIC), a digital signal processor (DSP), a programmable logic device (PLD), a field programmable gate array (FPGA), a central processing unit (CPU), a microcontroller, and/or a microprocessor.

When a fuel door switch is activated in a state where a vehicle is stopped and then a fuel door is opened, the processor 154 may execute the safety logic to initiate control processing. When the control processing is started, the processor 154 may determine whether the first pressure sensor 130 is faulty, based on the sensor voltage of the first pressure sensor 130. The processor 154 may determine whether the first pressure sensor 130 is disconnected or short-circuited, based on the sensor voltage of the first pressure sensor 130. When it is determined that the first pressure sensor 130 is disconnected or short-circuited, the processor 154 may determine that the first pressure sensor 130 is faulty. When the first pressure sensor 130 is faulty, the processor 154 may stop control processing. In other words, when it is determined that the first pressure sensor 130 is faulty, the processor 154 may terminate the safety logic.

When it is determined that the first pressure sensor 130 is not faulty, the processor 154 may detect the first hydrogen pressure and the second hydrogen pressure, which are respectively sensed by the first pressure sensor 130 and the second pressure sensor 140, through the detection device 151. At this time, the processor 154 may detect the first hydrogen pressure during a predetermined time.

The processor 154 may calculate a pressure slope (a first hydrogen pressure slope) by using the first hydrogen pressure detected during the predetermined time (t seconds). In other words, the processor 154 may calculate a first hydrogen pressure change rate during the predetermined time (e.g., 5 sec) by using the first hydrogen pressure thus detected.

The processor 154 may determine whether the vehicle is charged, based on the second hydrogen pressure thus detected. In other words, the processor 154 may determine whether the hydrogen tank 110 is being charged with hydrogen. When the vehicle is charged, the processor 154 may transition a control state (a control mode) of the control device 150 to a charging state.

The processor 154 may determine whether the vehicle is being charged with hydrogen and the first hydrogen pressure is not less than minimum reference pressure (e.g., 1750 kPa). The minimum reference pressure may be a criterion for determining whether the safety logic operates, to avoid the risk of false detection of the safety logic and may be set in advance.

When the vehicle is being charged with hydrogen and the first hydrogen pressure is not less than the minimum reference pressure, the processor 154 may compare the first hydrogen pressure slope thus previously calculated with a predetermined reference slope (e.g., 15 kPa/5 sec). The processor 154 may determine whether it is expected that noise is generated at the regulator 120, based on the comparison result. In detail, when the first hydrogen pressure slope is not less than the reference slope, the processor 154 may determine that it is expected that noise is generated at the regulator 120. In the meantime, when the first hydrogen pressure slope is less than the reference slope, the processor 154 may determine that noise is not generated at the regulator 120.

When it is determined that it is expected that noise is generated at the regulator 120, the processor 154 may transmit a charging stop signal through the communication device 152. The communication device 152 may transmit an infrared signal indicating that charging is stopped, to the hydrogen refueling station 300 by using an IR emitter 200. When it is predicted that noise is generated at the regulator 120 (i.e., a situation in which noise is generated), the processor 154 may stop hydrogen charging to prevent noise from being generated in advance.

The processor 154 may output a notification indicating that noise is generated at the regulator 120, through a display and/or speaker. Furthermore, the processor 154 may transmit, to a user terminal, a notification indicating that noise is generated at the regulator 120, in a form of a problem message and/or a push message.

In another embodiment, when the vehicle is charged with hydrogen and the first hydrogen pressure is not less than the predetermined minimum reference pressure, the processor 154 may start control according to the safety logic. At this time, when the second hydrogen pressure, which is hydrogen tank pressure and which is sensed by the second pressure sensor 140, is increased, the processor 154 may recognize that the vehicle is being charged.

The processor 154 may classify a charging state of the vehicle into five steps depending on the first hydrogen pressure. When the first hydrogen pressure is not less than the minimum reference pressure and is less than first reference pressure, the processor 154 may determine the charging state of the vehicle as a first charging state. When the first hydrogen pressure is not less than the first reference pressure and is less than second reference pressure, the processor 154 may determine the charging state of the vehicle as a second charging state. When the first hydrogen pressure is not less than the second reference pressure and is less than third reference pressure, the processor 154 may determine the charging state of the vehicle as a third charging state. When the first hydrogen pressure is not less than the third reference pressure and is less than fourth reference pressure, the processor 154 may determine the charging state of the vehicle as a fourth charging state. When the first hydrogen pressure is not less than the fourth reference pressure, the processor 154 may determine the charging state of the vehicle as a fifth charging state. In an embodiment, the charging state is classified into five (5) steps, but it is not limited thereto. For example, the charging state may be classified into at least two or more steps, for example, three steps or six steps depending on needs of a system designer. As a step of classifying the charging state is subdivided, fine control is possible. Accordingly, erroneous diagnosis may be prevented.

When the vehicle is in the first charging state, the processor 154 may determine whether a first hydrogen pressure slope (a first hydrogen pressure change rate) during a predetermined first time (e.g., 5 seconds) is not less than a first reference pressure slope T1. When the first hydrogen pressure slope during the first time is not less than the first reference pressure slope T1, the processor 154 may stop charging. The processor 154 may transmit a charging stop signal to the hydrogen refueling station 300 through the communication device 152. When the first hydrogen pressure slope during the first time is less than the first reference pressure slope T1, the processor 154 may proceed with charging. In other words, when the first hydrogen pressure slope during the first time is less than the first reference pressure slope T1, the processor 154 may allow the vehicle to maintain hydrogen charging.

When the vehicle is in the second charging state, the processor 154 may determine whether the first hydrogen pressure slope during a predetermined second time (e.g., 4 seconds) is not less than a second reference pressure slope T2. When the first hydrogen pressure slope during the second time is not less than the second reference pressure slope T2, the processor 154 may stop charging. When the first hydrogen pressure slope during the second time is less than the second reference pressure slope T2, the processor 154 may proceed with charging.

When the vehicle is in the third charging state, the processor 154 may determine whether the first hydrogen pressure slope during a predetermined third time (e.g., 3 seconds) is not less than a third reference pressure slope T3. When the first hydrogen pressure slope during the third time is not less than the third reference pressure slope T3, the processor 154 may stop charging. When the first hydrogen pressure slope during the third time is less than the third reference pressure slope T3, the processor 154 may proceed with charging.

When the vehicle is in the fourth charging state, the processor 154 may determine whether the first hydrogen pressure slope during a predetermined fourth time (e.g., 1 seconds) is not less than a fourth reference pressure slope T4. When the first hydrogen pressure slope during the fourth time is not less than the fourth reference pressure slope T4, the processor 154 may stop charging. When the first hydrogen pressure slope during the fourth time is less than the fourth reference pressure slope T4, the processor 154 may proceed with charging.

When the vehicle is in the fifth charging state, the processor 154 may determine whether the first hydrogen pressure slope during a predetermined fifth time (e.g., 0.5 seconds) is not less than a fifth reference pressure slope T5. When the first hydrogen pressure slope during the fifth time is not less than the fifth reference pressure slope T5, the processor 154 may stop charging. When the first hydrogen pressure slope during the fifth time is less than the fifth reference pressure slope T5, the processor 154 may proceed with charging.

In another embodiment, a solenoid valve (not shown) may be added to a front end of the regulator 120 in the hydrogen storage system 100. The processor 154 may determine whether it is expected that noise is generated at the regulator 120, based on the first hydrogen pressure slope. When it is expected that noise is generated at the regulator 120, the processor 154 may control the solenoid valve mounted on the front end of the regulator 120 and may control the pressure flowing into the regulator 120.

In another embodiment, the processor 154 may measure the noise generated at the regulator 120 by installing a noise meter 122 in the regulator 120. When noise measured by the noise meter 122 exceeds a predetermined threshold, the processor 154 may stop charging or may control pressure flowing into the regulator 120.

Figure 3:
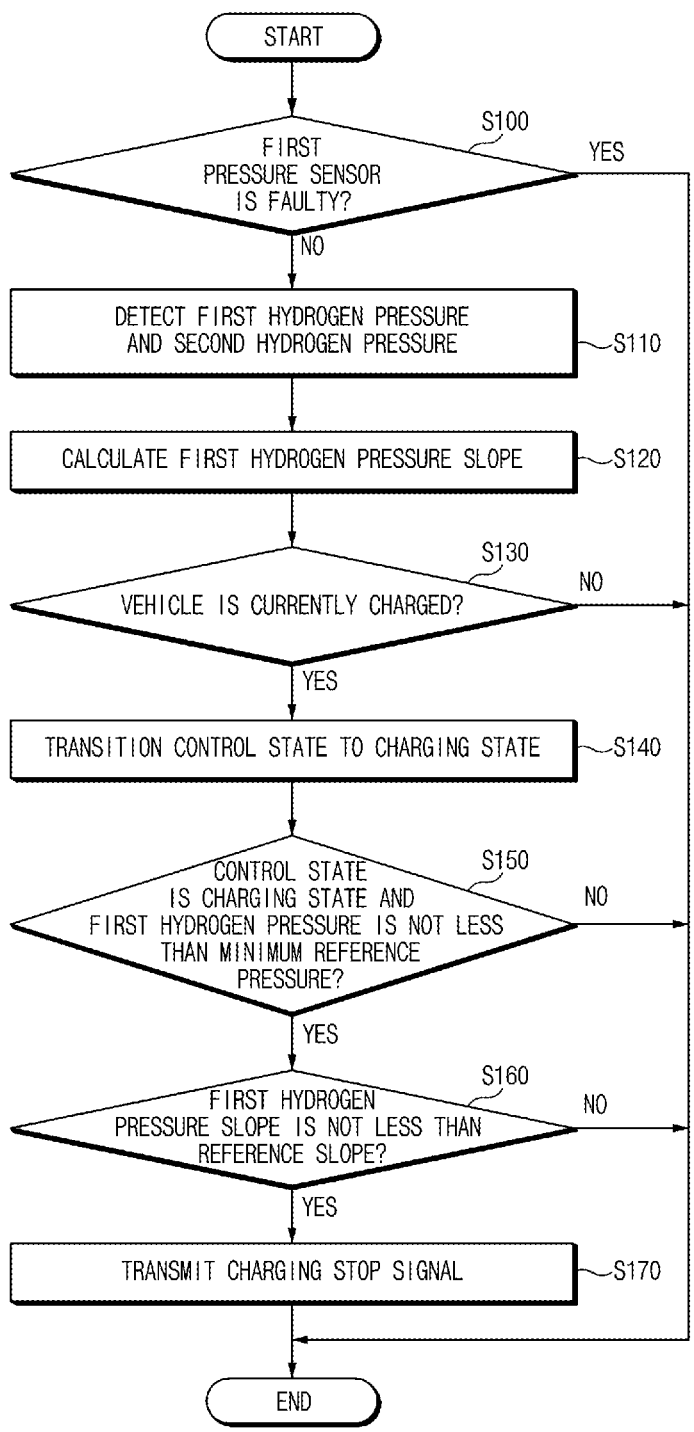
FIG. 3 is a flowchart illustrating a hydrogen storage system controlling method, according to an embodiment of the present disclosure.

FIG. 3 is a flowchart illustrating a hydrogen storage system controlling method, according to an embodiment of the present disclosure.

The processor 154 of the control device 150 may determine whether the first pressure sensor 130 is faulty at S100. When a fuel door is opened by operating a fuel door switch while a vehicle is not driving, the processor 154 may determine whether the first pressure sensor 130 is disconnected or short-circuited, based on a sensor voltage of the first pressure sensor 130.

When the first pressure sensor 130 is not faulty, the processor 154 may detect first hydrogen pressure and second hydrogen pressure at S110. The processor 154 may collect the first hydrogen pressure and the second hydrogen pressure, which are sensed by the first pressure sensor 130 and the second pressure sensor 140, through the detection device 151 during a predetermined time.

The processor 154 may calculate the slope of the detected first hydrogen pressure at S120. The processor 154 may calculate the first hydrogen pressure slope by using the first hydrogen pressure collected during the predetermined time. Here, the first hydrogen pressure slope may refer to the first hydrogen pressure change rate during the predetermined time.

The processor 154 may determine whether the vehicle is currently charged, based on the second hydrogen pressure at S130. The processor 154 may determine whether the vehicle is charged with hydrogen, based on the detected second hydrogen pressure. For example, when the second hydrogen pressure increases at a predetermined ratio or more, the processor 154 may determine that the vehicle is charged with hydrogen.

When it is determined that the vehicle is charged, the processor 154 may transition a control state of the control device 150 to a charging state at S140.

The processor 154 may determine whether the control state is the charging state and whether the first hydrogen pressure is not less than the minimum reference pressure at S150. The minimum reference pressure may be a criterion for determining whether the safety logic operates, to avoid the risk of false detection of the safety logic and may be set in advance.

When the control state is the charging state and the first hydrogen pressure is not less than the minimum reference pressure, the processor 154 may determine whether the slope of the first hydrogen pressure calculated in S120 is not less than the predetermined reference slope at S160. The processor 154 may determine whether it is expected that noise is generated at the regulator 120, based on a result of comparing the slope of the first hydrogen pressure with the predetermined reference slope.

When the slope of the first hydrogen pressure is not less than the predetermined reference slope, the processor 154 may transmit a charging stop signal at S170. At this time, the processor 154 may control the communication device 152 such that the IR emitter 200 sends an infrared signal indicating that charging is stopped. When the first hydrogen pressure slope is not less than the reference slope, the processor 154 may determine that it is expected that noise is generated at the regulator 120, and may stop hydrogen charging. In the meantime, when the first hydrogen pressure slope is less than the reference slope, the processor 154 may determine that noise is not generated at the regulator 120 and may maintain hydrogen charging.

Figure 4:
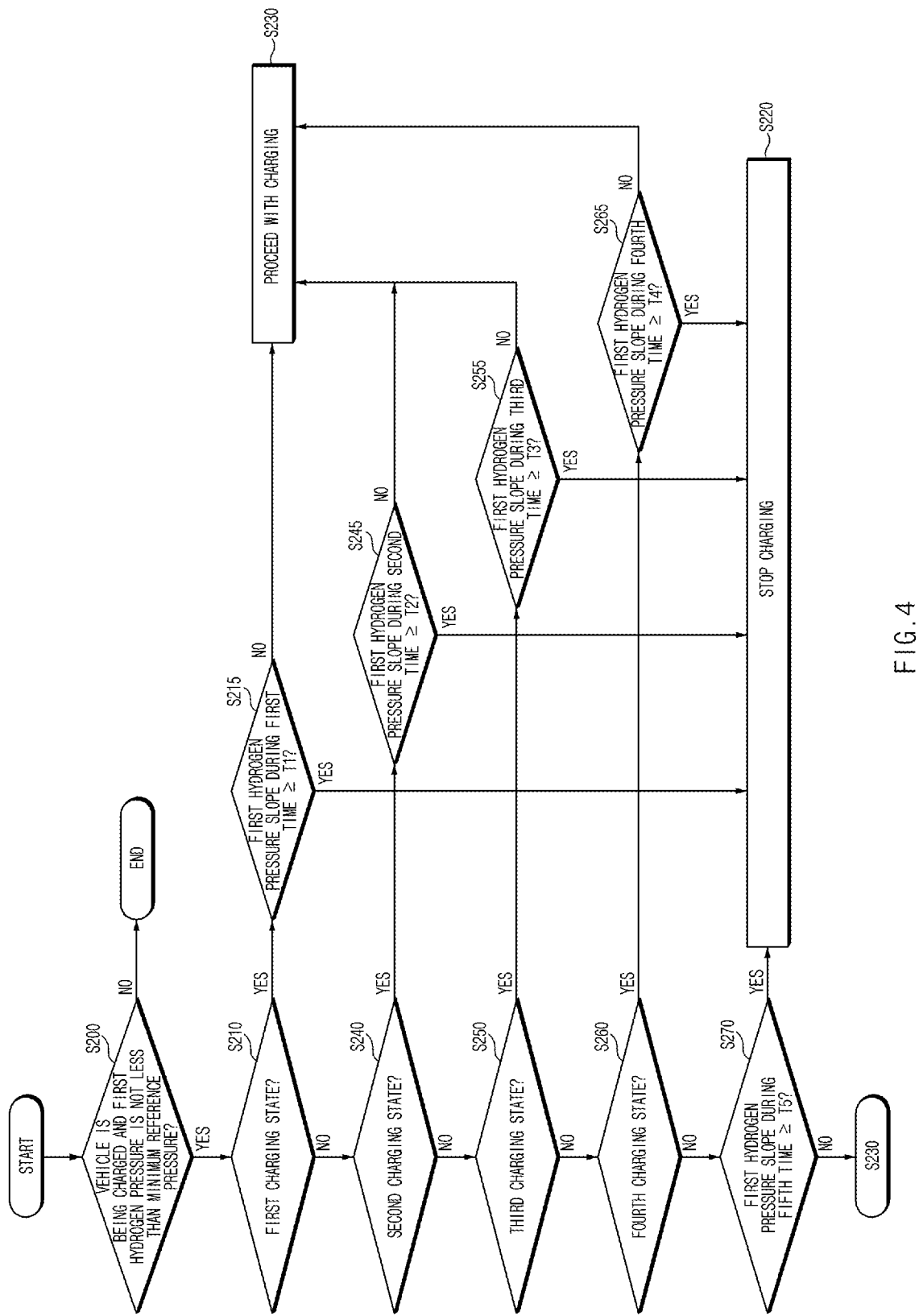
FIG. 4 is a flowchart illustrating a hydrogen storage system controlling method, according to another embodiment of the present disclosure.

FIG. 4 is a flowchart illustrating a hydrogen storage system controlling method, according to another embodiment of the present disclosure.

Referring to FIG. 4, the processor 154 may determine whether a vehicle is being charged and first hydrogen pressure is not less than predetermined minimum reference pressure at S200. The processor 154 may compare the first hydrogen pressure measured by the first pressure sensor 130 with the minimum reference pressure stored in the memory 153. When second hydrogen pressure (i.e., hydrogen tank pressure) measured by the second pressure sensor 140 is increased, the processor 154 may determine that the vehicle is charged with hydrogen. The processor 154 may determine whether to start a safety logic operation, based on whether the vehicle is charged with hydrogen, and a result of comparing the first hydrogen pressure with the minimum reference pressure.

When the vehicle is being charged and the first hydrogen pressure is not less than the minimum reference pressure, the processor 154 may determine whether the vehicle is in a first charging state, based on the first hydrogen pressure at S210. When the first hydrogen pressure is not less than the minimum reference pressure and is less than first reference pressure, the processor 154 may determine that the vehicle is in the first charging state.

When it is determined, in S210, that the vehicle is in the first charging state, the processor 154 may determine whether a first hydrogen pressure slope during a predetermined first time (e.g., 5 seconds) is not less than the first reference pressure slope T1 at S215. In other words, the processor 154 may calculate the first hydrogen pressure slope by using the first hydrogen pressure detected for 5 seconds. The processor 154 may compare the calculated first hydrogen pressure slope with a predetermined first reference pressure slope.

When the first hydrogen pressure slope during the first time is not less than the first reference pressure slope T1, the processor 154 may stop charging at S220. The processor 154 may transmit a charging stop signal to a hydrogen refueling station 300 through the communication device 152.

When the first hydrogen pressure slope during the first time is less than the first reference pressure slope T1, the processor 154 may proceed with charging at S230. In other words, when the first hydrogen pressure slope during the first time is less than the first reference pressure slope T1, the processor 154 may allow the vehicle to maintain hydrogen charging.

When it is determined, in S210, that the vehicle is not in the first charging state, the processor 154 may determine whether the vehicle is in a second charging state, based on the first hydrogen pressure at S240. When the first hydrogen pressure is not less than the first reference pressure and is less than second reference pressure, the processor 154 may determine that the vehicle is in the second charging state.

When it is determined, in S240, that the vehicle is in the second charging state, the processor 154 may determine whether the first hydrogen pressure slope during a predetermined second time (e.g., 4 seconds) is not less than the second reference pressure slope T2 at S245.

When the first hydrogen pressure slope during the second time is not less than the second reference pressure slope T2, the processor 154 may stop charging at S220.

When the first hydrogen pressure slope during the second time is less than the second reference pressure slope T2, the processor 154 may proceed with charging at S230.

When it is determined, in S240, that the vehicle is not in the second charging state, the processor 154 may determine whether the vehicle is in a third charging state, based on the first hydrogen pressure at S250. When the first hydrogen pressure is not less than the second reference pressure and is less than third reference pressure, the processor 154 may determine that the vehicle is in the third charging state.

When it is determined, in S250, that the vehicle is in the third charging state, the processor 154 may determine whether the first hydrogen pressure slope during a predetermined third time (e.g., 3 seconds) is not less than the third reference pressure slope T3 at S255.

When the first hydrogen pressure slope during the third time is not less than the third reference pressure slope T3, the processor 154 may stop charging at S220.

When the first hydrogen pressure slope during the third time is less than the third reference pressure slope T3, the processor 154 may proceed with charging at S230.

When it is determined, in S250, that the vehicle is not in the third charging state, the processor 154 may determine whether the vehicle is in a fourth charging state, based on the first hydrogen pressure at S260. When the first hydrogen pressure is not less than the third reference pressure and is less than fourth reference pressure, the processor 154 may determine that the vehicle is the fourth charging state.

When it is determined, in S260, that the vehicle is in the fourth charging state, the processor 154 may determine whether the first hydrogen pressure slope during a predetermined fourth time (e.g., 1 second) is not less than the fourth reference pressure slope T4 at S265.

When the first hydrogen pressure slope during the fourth time is not less than the fourth reference pressure slope T4, the processor 154 may stop charging at S220.

When the first hydrogen pressure slope during the fourth time is less than the fourth reference pressure slope T4, the processor 154 may proceed with charging at S230.

When it is determined, in S260, that the vehicle is not in the fourth charging state (i.e., when the vehicle is in a fifth charging state), the processor 154 may determine whether the first hydrogen pressure slope during a fifth time (e.g., 0.5 seconds) is not less than the fifth reference pressure slope T5 at S270.

When the first hydrogen pressure slope during the fifth time is not less than the fifth reference pressure slope T5, the processor 154 may stop charging at S220.

When the first hydrogen pressure slope during the fifth time is less than the fifth reference pressure slope T5, the processor 154 may proceed with charging at S230.

Because S215, S245, S255, and S265 are repeated at a period having a predetermined time (e.g., 100 ms), the processor 154 may determine whether to stop charging.

In an embodiment, the first time, the second time, the third time, the fourth time, and the fifth time may be set in order from greatest to smallest values. In other words, the second time may be set to be shorter than the first time; the third time may be set to be shorter than the second time; the fourth time may be set to be shorter than the third time; and the fifth time may be set to be shorter than the fourth time.

In an embodiment, the processor 154 may classify a charging state into 5 steps depending on the first hydrogen pressure and may calculate the first hydrogen pressure slope during a time different for each classified charging state. The processor 154 may compare the calculated first hydrogen pressure slope with a reference pressure slope that matches the classified charging state and may determine whether it is expected that noise is generated at the regulator 120, based on the comparison result. When the calculated first hydrogen pressure slope is not less than the reference pressure slope matching the classified charging state, the processor 154 may determine that it is expected that noise is generated at the regulator 120. When the calculated first hydrogen pressure slope is less than the reference pressure slope matching the classified charging state, the processor 154 may determine that it is expected that noise is not generated at the regulator 120. When it is determined that it is expected that noise is generated at the regulator 120, the processor 154 may stop charging. When it is determined that it is expected that noise is not generated at the regulator 120, the processor 154 may proceed with charging.

Figure 5:
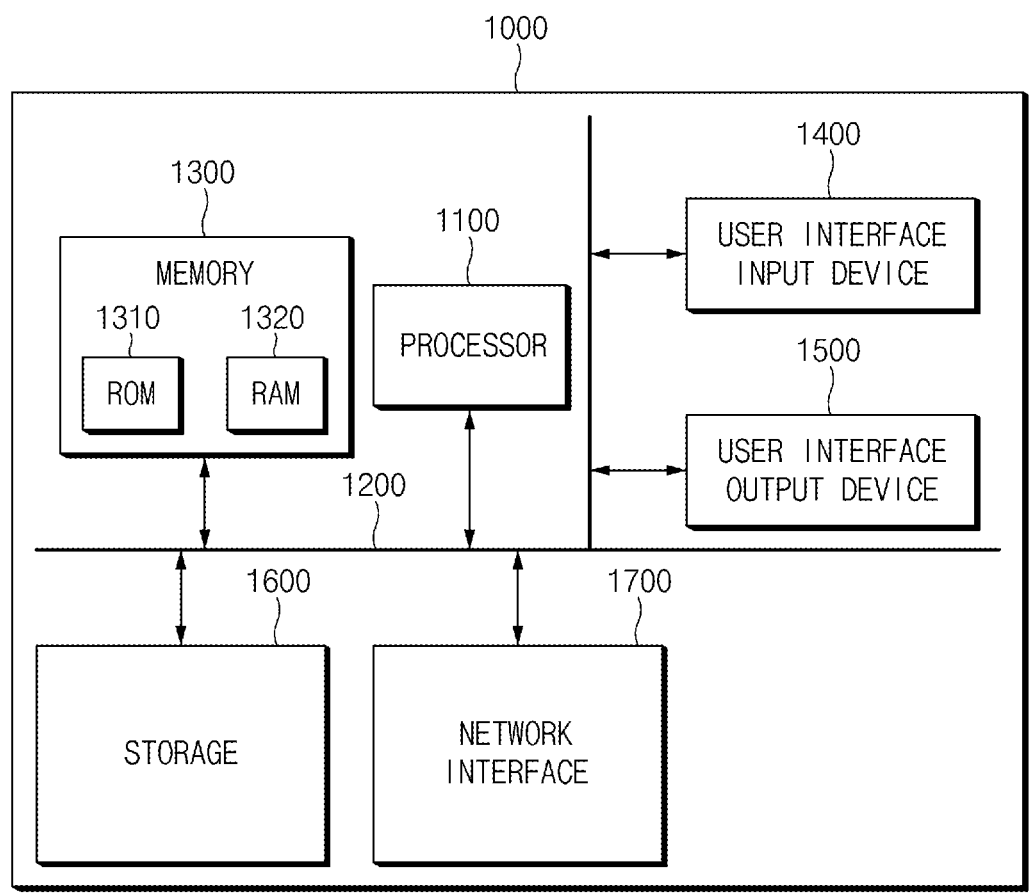
FIG. 5 is a block diagram illustrating a computing system performing a hydrogen storage system controlling method, according to an embodiment of the present disclosure.

FIG. 5 is a block diagram illustrating a computing system performing a hydrogen storage system controlling method, according to an embodiment of the present disclosure.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to an embodiment of the present disclosure, hydrogen charging is stopped based on a change in medium pressure output from a high-pressure regulator while hydrogen is charged, thereby preventing the high-pressure regulator from generating noise in advance. Accordingly, it is possible to solve a user's dissatisfaction and anxiety due to the noise of the high-pressure regulator generated while hydrogen is charged.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

The invention claimed is:

1. A hydrogen storage system comprising:
   a detection device configured to detect a first hydrogen pressure decompressed by a regulator using a first pressure sensor in the hydrogen storage system; and
   a processor configured to predict generation of noise at the regulator based on a change rate of the first hydrogen pressure during hydrogen charging, and to stop the hydrogen charging;
   wherein the processor is further configured to:
   classify a charging state into at least two or more steps depending on the first hydrogen pressure;
   calculate a first hydrogen pressure slope during a time different for each classified charging state;
   compare the calculated first hydrogen pressure slope with a reference pressure slope matching the classified charging state; and
   transmit a charging stop signal when the calculated first hydrogen pressure slope is not less than the reference pressure slope matching the classified charging state.

2. The hydrogen storage system of claim 1, wherein the processor is further configured to:
   compare the first hydrogen pressure with a predetermined minimum reference pressure; and
   start control according to safety logic when the first hydrogen pressure is not less than the predetermined minimum reference pressure.

3. The hydrogen storage system of claim 1, wherein the processor is further configured to:
   calculate a first hydrogen pressure slope using the first hydrogen pressure measured during a predetermined time interval;
   compare the calculated first hydrogen pressure slope with a predetermined reference slope; and
   transmit a charging stop signal when the calculated first hydrogen pressure slope is not less than the predetermined reference slope;
   wherein the hydrogen charging is maintained as the processor calculates the first hydrogen pressure slope, and determines the first hydrogen pressure slope is less than the predetermined reference slope corresponding to the predetermined time interval.

4. The hydrogen storage system of claim 1, further comprising:
   a solenoid valve mounted on a front end of the regulator, wherein the processor is configured to control the solenoid valve to adjust pressure flowing into the regulator when it is expected that the noise is generated at the regulator.

5. The hydrogen storage system of claim 1, further comprising:
   a noise meter configured to measure the noise generated at the regulator,
   wherein the processor is configured to stop the hydrogen charging based on noise data measured by the noise meter.

6. The hydrogen storage system of claim 1, wherein the detection device is configured to detect a second hydrogen pressure before decompression by the regulator using a second pressure sensor in the hydrogen storage system.

7. The hydrogen storage system of claim 6, wherein the processor determines whether the hydrogen charging is in progress based on the second hydrogen pressure.

8. The hydrogen storage system of claim 1, further comprising:
   a communication device configured to transmit a charging stop signal to a hydrogen refueling station through an IR emitter.

9. The hydrogen storage system of claim 1, wherein the processor is configured to determine whether the first pressure sensor is faulty based on a sensor voltage of the first pressure sensor.

10. A hydrogen storage system controlling method, the method comprising:
    detecting, by a processor, a first hydrogen pressure decompressed by a regulator using a first pressure sensor in a hydrogen storage system;
    predicting, by the processor, generation of noise at the regulator based on a change rate of the first hydrogen pressure during hydrogen charging; and
    stopping, by the processor, the hydrogen charging when it is expected that the noise is generated;
    wherein predicting the generation of the noise at the regulator includes:
    comparing, by the processor, a first hydrogen pressure slope during a predetermined first time with a predetermined first reference pressure slope when the first hydrogen pressure is not less than a minimum reference pressure and is less than a first reference pressure;
    determining, by the processor, that the noise is generated at the regulator, when the first hydrogen pressure slope during the predetermined first time is not less than the predetermined first reference pressure slope; and
    determining, by the processor, that the noise is not generated at the regulator, when the first hydrogen pressure slope during the predetermined first time is less than the predetermined first reference pressure slope.

11. The method of claim 10, wherein predicting the generation of the noise at the regulator includes:
    calculating, by the processor, a first hydrogen pressure slope using the first hydrogen pressure measured during a predetermined time interval;
    comparing, by the processor, the first hydrogen pressure slope with a predetermined reference slope; and
    determining, by the processor, that the noise is generated at the regulator, when the first hydrogen pressure slope is not less than the predetermined reference slope;
    wherein the hydrogen charging is maintained as the processor calculates the first hydrogen pressure slope, and determines the first hydrogen pressure slope is less than the predetermined reference slope corresponding to the predetermined time interval.

12. The method of claim 10, wherein predicting the generation of the noise at the regulator further includes:
    comparing, by the processor, the first hydrogen pressure slope during a predetermined second time with a predetermined second reference pressure slope when the first hydrogen pressure is not less than the first reference pressure and is less than a second reference pressure;

determining, by the processor, that the noise is generated at the regulator, when the first hydrogen pressure slope during the predetermined second time is not less than the predetermined second reference pressure slope; and determining, by the processor, that the noise is not generated at the regulator, when the first hydrogen pressure slope during the predetermined second time is less than the predetermined second reference pressure slope.

13. The method of claim 12, wherein predicting the generation of the noise at the regulator further includes:

comparing, by the processor, the first hydrogen pressure slope during a predetermined third time with a predetermined third reference pressure slope when the first hydrogen pressure is not less than the second reference pressure and is less than a third reference pressure;

determining, by the processor, that the noise is generated at the regulator, when the first hydrogen pressure slope during the predetermined third time is not less than the predetermined third reference pressure slope; and determining, by the processor, that the noise is not generated at the regulator, when the first hydrogen pressure slope during the predetermined third time is less than the predetermined third reference pressure slope.

14. The method of claim 13, wherein predicting the generation of the noise at the regulator further includes:

comparing, by the processor, the first hydrogen pressure slope during a predetermined fourth time with a predetermined fourth reference pressure slope when the first hydrogen pressure is not less than the third reference pressure and is less than a fourth reference pressure;

determining, by the processor, that the noise is generated at the regulator, when the first hydrogen pressure slope during the predetermined fourth time is not less than the predetermined fourth reference pressure slope; and determining, by the processor, that the noise is not generated at the regulator, when the first hydrogen pressure slope during the predetermined fourth time is less than the predetermined fourth reference pressure slope.

15. The method of claim 14, wherein predicting the generation of the noise at the regulator further includes:

comparing, by the processor, the first hydrogen pressure slope during a predetermined fifth time with a predetermined fifth reference pressure slope when the first hydrogen pressure is not less than the fourth reference pressure;

determining, by the processor, that the noise is generated at the regulator, when the first hydrogen pressure slope during the predetermined fifth time is not less than the predetermined fifth reference pressure slope; and determining, by the processor, that the noise is not generated at the regulator, when the first hydrogen pressure slope during the predetermined fifth time is less than the predetermined fifth reference pressure slope.

16. The method of claim 15, wherein the first time, the second time, the third time, the fourth time, and the fifth time are set in order from greatest to smallest values.

17. The method of claim 10, further comprising:

detecting, by the processor, a second hydrogen pressure before decompression by the regulator using a second pressure sensor in the hydrogen storage system; and determining, by the processor, whether the hydrogen charging is in progress based on the second hydrogen pressure.

18. The method of claim 10, wherein stopping the hydrogen charging includes:

transmitting, by the processor, a charging stop signal to a hydrogen refueling station through a communication device.

* * * * *